US 6,656,868 B2
Dec. 2, 2003

(12) United States Patent
Oskam et al.

(54) POLYMERIZATION CATALYST COMPOSITIONS

(75) Inventors: John H. Oskam, Flemington, NJ (US); Timothy R. Lynn, Hackettstown, NJ (US); Vincent P. Morrison, Pistcataway, NJ (US)

(73) Assignee: Univation Technologies, LLC, Houston, TX (US)

( * ) Notice: Subject to any disclaimer, the term of this patent is extended or adjusted under 35 U.S.C. 154(b) by 71 days.

This patent is subject to a terminal disclaimer.

(21) Appl. No.: 09/867,156

(22) Filed: May 29, 2001

(65) Prior Publication Data

US 2001/0034423 A1 Oct. 25, 2001

Related U.S. Application Data

(62) Division of application No. 09/464,114, filed on Dec. 16, 1999, now Pat. No. 6,281,306.

(51) Int. Cl.$^7$ .......................... B01J 31/00; B01J 37/00; C08F 4/02; C08F 4/60
(52) U.S. Cl. ................ 502/155; 502/103; 502/117; 502/128; 502/153; 502/167; 502/154
(58) Field of Search ................. 502/102, 103, 502/113, 117, 153, 159, 167, 171

(56) References Cited

U.S. PATENT DOCUMENTS 4,057,565 A * 11/1977 Manzer .................. 260/429 R (List continued on next page.)

FOREIGN PATENT DOCUMENTS

EP       0 197 310     * 10/1986

(List continued on next page.)

OTHER PUBLICATIONS

H. Furhmann, Inorg. Chem., vol. 35, No. 23, pp. 6742–6745 (1996).*

(List continued on next page.)

*Primary Examiner*—Mark L. Bell
*Assistant Examiner*—J Pasterczyk
(74) *Attorney, Agent, or Firm*—LIsa Kimes Jones; Kevin N. Faulkner

(57) ABSTRACT

This invention relates to a catalyst composition suitable for a polymerization process comprising, in one embodiment, a particulate filler, mineral oil and at least one metal catalyst compound. In another embodiment, the particular filler is fumed. The catalyst Composition includes a Group 15-containing metal catalyst compound represented by the formula:

$$\begin{array}{c} R^4 \\ | \\ R^1\!-\!Y\!\diagdown\!R^6 \\ R^3\!-\!L\!-\!-\!-\!-\!M^nX_{n+m} \\ R^2\!-\!Z\!\diagup \\ | \quad \diagdown R^7 \\ R^5 \end{array}$$

wherein M is a Group 4, 5 or 6 metal;

each X is independently selected from anionic leaving groups;

n is the oxidation slate of M;

m is the formal charge of a ligand comprising Y, Z and L;

Y, Z and L are Group 15 atoms;

$R^1$ and $R^2$ are independently a $C_{10}$ to $C_{20}$ hydrocarbon group, or a heteroatom containing group wherein the heteroatom is a silicon, germanium, tin, lead, or phosphorus;

$R^3$ is absent, a hydrogen, a group 14 atom containing group, a halogen, or a heteroatom containing group;

$R^4$ and $R^5$ are independently an alkyl group, an aryl group, a substituted aryl group, a cyclic alkyl group, a substituted cyclic alkyl group, or a multiple ring system; and $R^6$ and $R^7$ are independently absent, a hydrogen, an alkyl group, a halogen, a heteroatom, a hydrocarbyl group, or a heteroatom containing group.

39 Claims, 1 Drawing Sheet

U.S. PATENT DOCUMENTS

| | | | | | |
|---|---|---|---|---|---|
| 4,565,796 | A | * | 1/1986 | Etherton | 502/112 |
| 5,318,935 | A | | 6/1994 | Canich et al. | 502/117 |
| 5,426,243 | A | * | 6/1995 | Lecouve | 568/737 |
| 5,614,456 | A | * | 3/1997 | Mink et al. | 502/115 |
| 5,622,906 | A | * | 4/1997 | Pettijohn | 502/104 |
| 5,637,660 | A | * | 6/1997 | Nagy et al. | 526/160 |
| 5,643,846 | A | * | 7/1997 | Reddy et al. | 502/104 |
| 5,672,669 | A | | 9/1997 | Wasserman et al. | 526/170 |
| 5,674,795 | A | | 10/1997 | Wasserman et al. | 502/9 |
| 5,674,796 | A | * | 10/1997 | Lee et al. | 502/22 |
| 5,707,913 | A | * | 1/1998 | Schlund et al. | 502/102 |
| 5,726,115 | A | * | 3/1998 | Horton et al. | 502/152 |
| 5,798,427 | A | * | 8/1998 | Foster et al. | 526/352 |
| 5,889,128 | A | | 3/1999 | Schrock et al. | 526/107 |
| 5,955,555 | A | * | 9/1999 | Bennett | 526/133 |
| 6,265,505 | B1 | * | 7/2001 | McConville et al. | 526/161 |
| 6,271,323 | B1 | * | 8/2001 | Loveday et al. | 526/161 |
| 6,271,325 | B1 | * | 8/2001 | McConville et al. | 526/217 |
| 6,274,684 | B1 | * | 8/2001 | Loveday et al. | 526/114 |
| 6,300,438 | B1 | * | 10/2001 | McConville | 526/161 |
| 6,300,439 | B1 | * | 10/2001 | McConville | 526/161 |
| 6,333,389 | B2 | * | 12/2001 | Whiteker et al. | 526/161 |
| 6,380,328 | B1 | * | 4/2002 | McConville et al. | 526/119 |
| 6,399,722 | B1 | * | 6/2002 | Szul et al. | 526/113 |
| 6,417,304 | B1 | * | 7/2002 | McConville et al. | 526/161 |
| 6,518,444 | B1 | * | 2/2003 | McConville et al. | 502/103 |
| 2001/0029232 | A1 | * | 10/2001 | Eisen et al. | 502/103 |
| 2001/0031695 | A1 | * | 10/2001 | Loveday et al. | 502/117 |
| 2002/0103071 | A1 | * | 8/2002 | Oskam | 502/103 |
| 2002/0107137 | A1 | * | 8/2002 | Peterson et al. | 502/103 |
| 2002/0111443 | A1 | * | 8/2002 | Szul et al. | 502/113 |
| 2002/0119890 | A1 | * | 8/2002 | Wenzel et al. | 502/103 |

FOREIGN PATENT DOCUMENTS

| | | | |
|---|---|---|---|
| EP | 0 241 560 | * | 10/1987 |
| EP | 0 751 142 | * | 1/1997 |
| EP | 0 816 372 | * | 1/1998 |
| EP | 0 816 384 | * | 1/1998 |
| EP | 0668295 B1 | | 6/1998 |
| EP | 0874005 A1 | | 10/1998 |
| EP | 0 803 520 | * | 12/1998 |
| EP | 0 890 575 | * | 1/1999 |
| EP | 0893454 A1 | | 1/1999 |
| EP | 0 893 454 | * | 1/1999 |
| JP | 2-78663 | * | 3/1990 |
| JP | 8-81415 | * | 3/1996 |
| JP | 8-277307 | * | 10/1996 |
| JP | 10-7712 | * | 1/1998 |
| JP | 10-45904 | * | 2/1998 |
| JP | 10330412 | | 12/1998 |
| JP | 10330416 | | 12/1998 |
| WO | 91/12285 | * | 8/1991 |
| WO | 92/12162 | * | 7/1992 |
| WO | 94/21700 | * | 9/1994 |
| WO | 96/08498 | * | 3/1996 |
| WO | 97/42197 | * | 11/1997 |
| WO | 97/45434 | * | 12/1997 |
| WO | 97/48735 | * | 12/1997 |
| WO | 97/48736 | * | 12/1997 |
| WO | 98/27124 | * | 6/1998 |
| WO | 98/30569 | * | 7/1998 |
| WO | 98/30612 | * | 7/1998 |
| WO | 98/37106 | * | 8/1998 |
| WO | 98/37109 | * | 8/1998 |
| WO | 98/46651 | * | 10/1998 |
| WO | 98/55467 | * | 12/1998 |
| WO | 99/01460 | * | 1/1999 |
| WO | 99/02472 | * | 1/1999 |
| WO | 99/02536 | * | 1/1999 |
| WO | 99/12981 | * | 3/1999 |
| WO | 99/46303 | * | 9/1999 |
| WO | 99/46304 | * | 9/1999 |

OTHER PUBLICATIONS

H.C.S. Clark et al., J. Organomet. Chem., vol. 501, pp. 333–340 (1995).*

A.U. Harkonen et al., J. Organomet. Chem., vol. 519, pp. 205–208 (1996).*

J. Scollard et al., J. Am. Chem. Soc., vol. 118, No. 41, pp. 10008–10009 (1996).*

R. Baumann et al., J. Am. Chem. Soc., vol. 119, No. 16, pp. 3830–3831 (1997).*

L. Liang et al., J. Am. Chem. Soc., vol. 121, No. 24, pp. 5797–5798 (1999).*

T. Repo et al., Macromolecules, vol. 30, No. 2, pp. 171–175 (1997).*

G. Di Silvestro et al., Macromol. Chem. Phys., vol. 197, pp. 3209–3228 (1996).*

A. Horton et al., Organometallics, vol. 15, No. 12, pp. 2672–2674 (1996).*

F. Guerin et al., Organometallics, vol. 15, No. 24, pp. 5085–5089 (1996).*

F. Guerin et al., Organometallics, vol. 15, No. 26, pp. 5586–5590 (1996).*

X. Bei et al., Organometallics, vol. 16, No. 15, pp. 3282–3302 (1997).*

C. Wang et al., Organometallics, vol. 17, No. 15, pp. 3149–3151 (1998).*

F. Guerin et al., Organometallics, vol. 17, No. 23, pp. 5172–5177 (1998).*

F.G.N. Cloke et al., J. Chem. Soc. Dalton Trans. 1995, pp. 25–30.*

F. Guerin et al., Polyhedron, vol. 17, No. 5–6, pp. 917–923 (1998).*

*Macromolecules*, Repo et al., vol. 30, pp. 171–175, 1997.

* cited by examiner

POLYMERIZATION CATALYST COMPOSITIONS

RELATED APPLICATION DATA

This application is a Divisional of U.S. patent application, Ser. No. 09/464,114, filed Dec. 16, 1999 now issued as U.S. Pat. No. 6,281,306.

FIELD OF THE INVENTION

This invention relates to spray dried olefin polymerization catalysts and their use in gas or slurry phase to produce polyolefins.

BACKGROUND OF THE INVENTION

The intense commercialization of metallocene polyolefin catalysts (metallocene being cyclopentadienyl based transition metal catalyst compounds) has led to widespread interest in the design of non-metallocene, homogeneous catalysts, particularly for use in the economical gas and slurry phase processes. This field is more than an academic curiosity as new, non-metallocene catalysts in gas or slurry phase may provide an easier, more economical pathway to currently available products and may also provide product and process opportunities which are beyond the capability of metallocene catalysts in the gas or slurry phase.

New catalysts, however, are not automatically useable in the gas phase. Some catalysts are too active and foul the reactor. Other catalysts cannot be supported and thus cannot be introduced into the reactor in such as way that fouling does not occur. Thus there is a need in the art for a method of providing catalysts to a gas phase or slurry phase reactor, particularly catalysts that are difficult or impossible to support.

Schrock et al in U.S. Pat. No. 5,889,128 discloses a process for the living polymerization of olefins in solution using initiators having a metal atom and a ligand having two group 15 atoms and a group 16 atom or three group 15 atoms. In particular, the solution phase polymerization of ethylene using $\{[NON]ZrMe\}[MeB(C_6F_5)_3]$ or $\{[NON]ZrMe(PhNMe_2)]\}[B(C_6F_5)_4]$ is disclosed in examples 9 and 10.

EP 893 454 A1 discloses unsupported transition metal amide compounds used in combination with activators to polymerize olefins in the solution phase.

Mitsui Chemicals, Inc. in EP 0 893 454 A1 discloses transition metal amides combined with activators to polymerize olefins.

EP 0 874 005 A1 discloses phenoxide compounds with an imine substituent for use as a polymerization catalyst.

EP 893 454 A1 discloses unsupported transition metal amide compounds used in combination with activators to polymerize olefins in the solution phase.

U.S. Ser. No. 09/312,878 filed May 17, 1999 discloses a gas or slurry phase polymerization process using a supported bisamide catalyst.

Japanese Abstract JP 10330416A appears to disclose transition metal amide catalysts in combination with Ziegler-Natta catalysts. Japanese Abstract JP 10330412A appears to disclose transition metal amide catalysts in combination with group 4 transition metal cyclopentadienyl catalysts.

Ethylenebis(salicylideneiminato)zirconium dichloride combined with methyl alumoxane deposited on a support and unsupported versions were used to polymerize ethylene by Repo et al in Macromolecules 1997, 30, 171–175.

U.S. Pat. Nos. 5,672,669, 5,674,795 and EP 0 668 295 B1 disclose spray dried filled metallocene catalyst compositions for use in gas phase polymerizations.

SUMMARY OF THE INVENTION

This invention relates to a catalytic molecule, and a spray dried catalyst system comprising a particulate filler, an activator, and a metal catalyst compound.

In one aspect the particulate filler may be any known particulate filler including carbon black, talc; inorganic oxides such as silica; magnesium chloride, alumina, silica-alumina; polymeric materials such as polyethylene, polypropylene, polystyrene, cross-linked polystyrene; and the like.

Preferred activators include conventional-co-catalysts, alkyl aluminum compounds (such as diethylaluminum chloride), alumoxanes, modified alumoxanes, non-coordinating anions, non-coordinating group 13 metal or metalloid anions, boranes, borates and the like. It is within the scope of this invention to use alumoxane or modified alumoxane as an activator, and/or to also use ionizing activators, neutral or ionic, such as tri (n-butyl) ammonium tetrakis (pentafluorophenyl) boron or a trisperfluorophenyl boron metalloid precursor which ionize the neutral metallocene compound. Other useful compounds include triphenyl boron, triethyl boron, tri-n-butyl ammonium tetraethylborate, triaryl borane and the like. Other useful compounds include aluminate salts as well.

Some of many metal catalyst compounds that may be used herein include a group 15 containing metal compound as described below and or phenoxide based catalysts as described below.

DETAILED DESCRIPTION OF THE INVENTION

Figure 1:
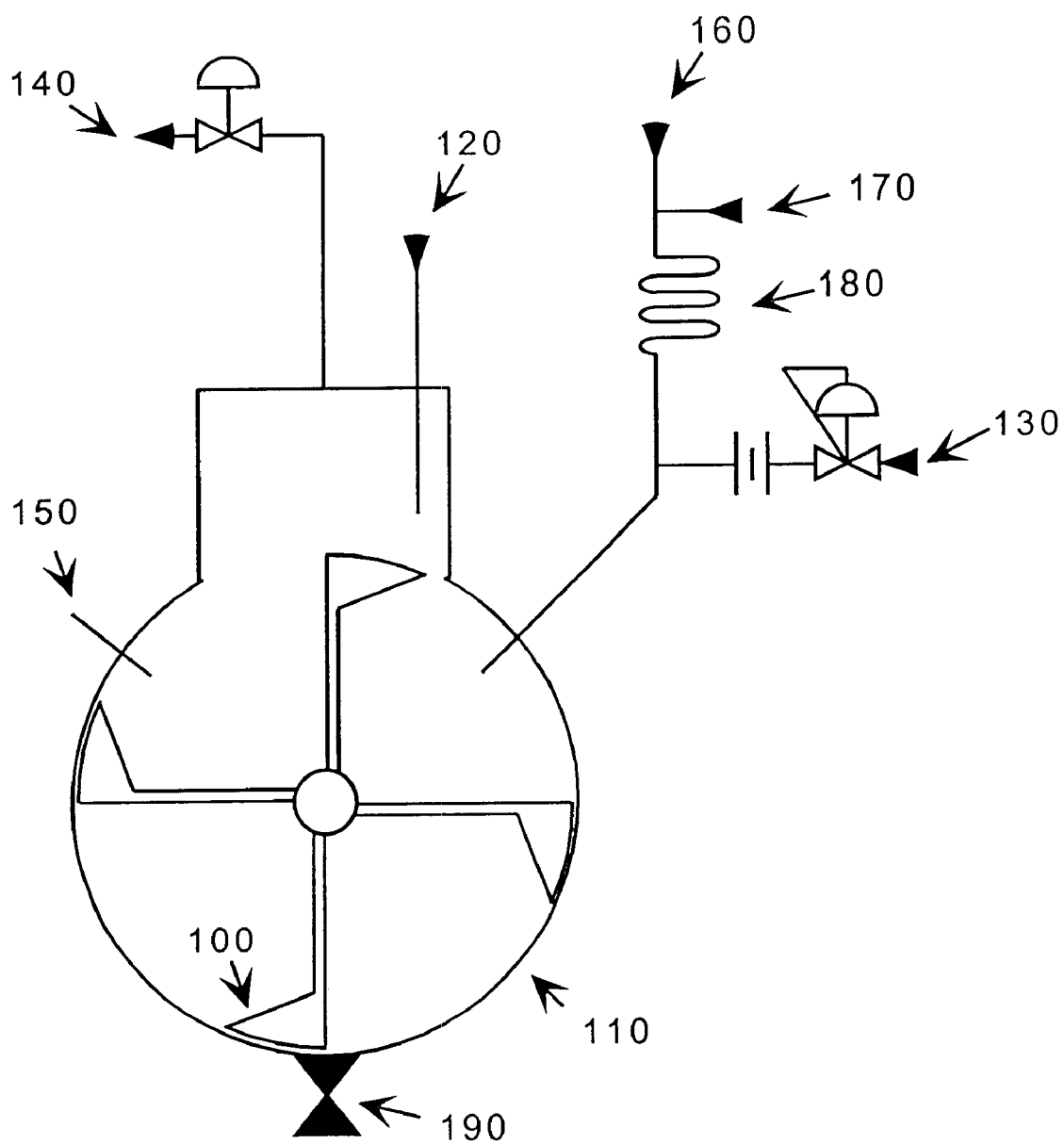
FIG. 1 depicts the horizontally mixed reactor system used in Comparative 9 and Examples 22 through 28.

The present invention relates to a spray dried catalyst system comprising a particulate filler, an activator, and one or more metal catalyst compounds. The metal catalyst compounds show the surprising ability to be immobilized with a filler, activated by an activator, and surprising robustness and catalytic activity.

In a preferred embodiment herein the particulate filler is fumed silica. Preferably the filler is Cabosil TS-610™, available from Cabot Corporation, which is a fumed silica with particles 7 to 30 nanometers in size that has been treated with dimethylsilyldichloride such that a majority of hydroxyl groups are capped. The spray dried particles are generally fed into the polymerization reactor as a mineral oil slurry. Solids concentrations in oil are about 10–15 weight %, preferably 11–14 weight %. In some embodiments, the spray dried particles are <~10 micrometers in size from the lab-scale Buchi spray-dryer, while the scaled up rotary atomizers can create particles ~25 micrometers, compared to conventional supported catalysts which are ~50 micrometers. In a preferred embodiment the particulate filler has an average particle size of 0.001 to 1 microns, preferably 0.001 to 0.1 microns.

In a preferred embodiment the metal catalyst compound comprises one or more of the following catalysts:

Catalysts

Preferred catalysts or catalysts systems that may be used herein include a group 15 containing metal compound and/or the phenoxide catalysts as described below. Other catalysts that may be used in combination with the group 15 containing metal compound and/or the phenoxides include bulky ligand metallocene type catalysts with optional activator.

Once the catalysts described herein have been spray dried they may be combined with other more conventional catalysts and introduced into a reactor. For example a spray dried catalyst or mixture of catalysts can be combined with conventional type transition metal catalysts (such as one or more Ziegler-Natta catalysts, vanadium catalysts and/or chromium catalysts) in a mineral oil and introduced into a reactor in a slurry.

For more information on conventional type transition metal catalysts please see *Ziegler-Natta Catalysts and Polymerizations*, John Boor, Academic Press, New York, 1979. Examples of conventional-type transition metal catalysts are also discussed in U.S. Pat. Nos. 4,115,639, 4,077,904, 4,482,687, 4,564,605, 4,721,763, 4,879,359, 4,960,741, 4,302,565, 4,302,566, 5,317,036, 3,709,853, 3,709,954, 3,231,550, 3,242,099, 4,077,904, 4,124,532, 4,302,565, 4,302,566, 4,376,062, 4,379,758, 5,066,737, 5,763,723, 5,849,655, 5,852,144, 5,854,164, 5,869,585, 3,487,112, 4,472,559, 4,182,814 and 4,689,437 and published EP-A2 0 416 815 A2 and EP-A1 0 420 436, and British Patent Application 2,105,355.

For purposes of this invention cyclopentadienyl group is defined to include indenyls and fluorenyls.

Group 15 Containing Metal Compound

The mixed catalyst composition of the present invention includes a Group 15 containing metal compound. The Group 15 containing compound generally includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 or 16 atom through another group.

In one preferred embodiment, at least one of the Group 15 atoms is also bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

In a preferred embodiment, the Group 15 containing metal compound of the present invention may be represented by the formulae:

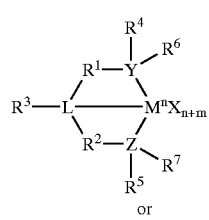

Formula I

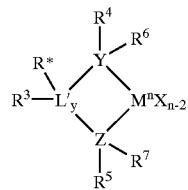

Formula II wherein
M is a Group 3 to 12 transition metal or a Group 13 or 14 main group metal, preferably a Group 4, 5, or 6 metal, and more preferably a Group 4 metal, and most preferably zirconium, titanium or hafnium, each X is independently a leaving group, preferably, an anionic leaving group, and more preferably hydrogen, a hydrocarbyl group, a heteroatom or a halogen, and most preferably an alkyl.

y is 0 or 1 (when y is 0 group L' is absent), n is the oxidation state of M, preferably +3, +4, or +5, and more preferably +4, m is the formal charge of the YZL or the YZL' ligand, preferably 0, −1, −2 or −3, and more preferably −2, L is a Group 15 or 16 element, preferably nitrogen, L' is a Group 15 or 16 element or Group 14 containing group, preferably carbon, silicon or germanium, Y is a Group 15 element, preferably nitrogen or phosphorus, and more preferably nitrogen, Z is a Group 15 element, preferably nitrogen or phosphorus, and more preferably nitrogen, $R^1$ and $R^2$ are independently a $C_1$ to $C_{20}$ hydrocarbon group, a heteroatom containing group having up to twenty carbon atoms, silicon, germanium, tin, lead, halogen or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group. $R^1$ and $R^2$ may also be interconnected to each other.

$R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, for example $PR_3$, where R is an alkyl group, $R^1$ and $R^2$ may be interconnected to each other, and/or $R^4$ and $R^5$ may be interconnected to each other, $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent, and R* is absent, or is hydrogen, a Group 14 atom containing group, a halogen, ora heteroatom containing group.

By "formal charge of the YZL or YZL' ligand", it is meant the charge of the entire ligand absent the metal and the leaving groups X.

By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

An alkyl group may be a linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof An aralkyl group is defined to be a substituted aryl group.

In a preferred embodiment $R^4$ and $R^5$ are independently a group represented by the following formula:

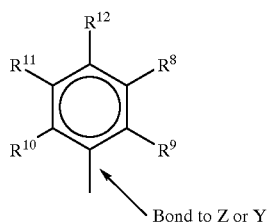

Formula 1

Bond to Z or Y wherein $R^8$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. In a preferred embodiment $R^9$, $R^{10}$ and $R^{12}$ are independently a methyl, ethyl, propyl or butyl group (including all isomers), in a preferred embodiment $R^9$, $R^{10}$ and $R^{12}$ are methyl groups, and $R^8$ and $R^{11}$ are hydrogen.

In a particularly preferred embodiment $R^4$ and $R^5$ are both a group represented by the following formula:

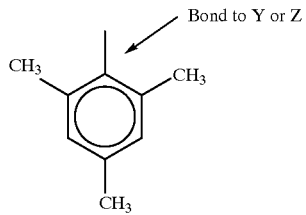

Formula 2

Bond to Y or Z

In this embodiment, M is a Group 4 metal, preferably zirconium, titanium or hafnium, and even more preferably zirconium; each of L, Y, and Z is nitrogen; each of $R^1$ and $R^2$ is —$CH_2$—$CH_2$—; $R^3$ is hydrogen; and $R^6$ and $R^7$ are absent.

In a particularly preferred embodiment the Group 15 containing metal compound is represented by the formula:

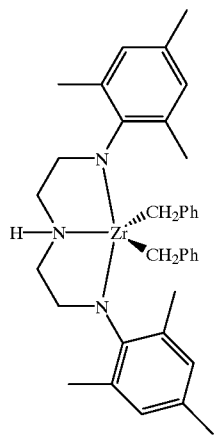

Compound I

In compound I, Ph equals phenyl.

The Group 15 containing metal compounds of the invention are prepared by methods known in the art, such as those disclosed in EP 0 893 454 A1, U.S. Pat. No. 5,889,128 and the references cited in U.S. Pat. No. 5,889,128 which are all herein incorporated by reference. U.S. application Ser. No. 09/312,878, filed May 17, 1999, discloses a gas or slurry phase polymerization process using a supported bisamide catalyst, which is also incorporated herein by reference.

A preferred direct synthesis of these compounds comprises reacting the neutral ligand, (see for example YZL or YZL' of formula 1 or 2) with $M^nX_n$ (M is a Group 3 to 14 metal, n is the oxidation state of M, each X is an anionic group, such as halide, in a non-coordinating or weakly coordinating solvent, such as ether, toluene, xylene, benzene, methylene chloride, and/or hexane or other solvent having a boiling point above 60° C., at about 20 to about 150° C. (preferably 20 to 100° C.), preferably for 24 hours or more, then treating the mixture with an excess (such as four or more equivalents) of an alkylating agent, such as methyl magnesium bromide in ether. The magnesium salts are removed by filtration, and the metal complex isolated by standard techniques.

In one embodiment the Group 15 containing metal compound is prepared by a method comprising reacting a neutral ligand, (see for example YZL or YZL' of formula 1 or 2) with a compound represented by the formula $M^nX_n$ (where M is a Group 3 to 14 metal, n is the oxidation state of M, each X is an anionic leaving group) in a non-coordinating or weakly coordinating solvent, at about 20° C. or above, preferably at about 20 to about 100° C., then treating the mixture with an excess of an alkylating agent, then recovering the metal complex. In a preferred embodiment the solvent has a boiling point above 60° C., such as toluene, xylene, benzene, and/or hexane. In another embodiment the solvent comprises ether and/or methylene chloride, either being preferable.

For additional information of Group 15 containing metal compounds, please see Mitsui Chemicals, Inc. in EP 0 893 454 A1 which discloses transition metal amides combined with activators to polymerize olefins.

Phenoxide Catalysts

Another group of catalysts that may be used in the process of this invention include one or more catalysts represented by the following formulae:

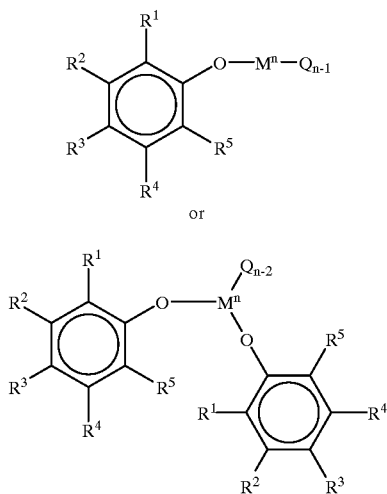

wherein $R^1$ is hydrogen or a $C_4$ to $C_{100}$ group, preferably a tertiary alkyl group, preferably a $C_4$ to $C_{20}$ alkyl group, preferably a $C_4$ to $C_{20}$ tertiary alkyl group, preferably a neutral $C_4$ to $C_{100}$ group and may or may not also be bound to M, and at least one of $R^2$ to $R^5$ is a group containing a heteroatom, the rest of $R^2$ to $R^5$ are independently hydrogen or a $C_1$ to $C_{100}$ group, preferably a $C_4$ to $C_{20}$ alkyl group (preferably butyl, isobutyl, pentyl hexyl, heptyl, isohexyl, octyl, isooctyl, decyl, nonyl, dodecyl) and any of $R^2$ to $R^5$ also may or may not be bound to M, O is oxygen, M is a group 3 to group 10 transition metal or lanthanide metal, preferably a group 4 metal, preferably Ti, Zr or Hf, n is the valence state of the metal M, preferably 2, 3, 4, or 5, Q is an alkyl, halogen, benzyl, amide, carboxylate, carbamate, thiolate, hydride or alkoxide group, or a bond to an R group containing a heteroatom which may be any of $R^1$ to $R^5$ A heteroatom containing group may be any heteroatom or a heteroatom bound to carbon silica or another heteroatom. Preferred heteroatoms include boron, aluminum, silicon, nitrogen, phosphorus, arsenic, tin, lead, antimony, oxygen, selenium, tellurium. Particularly preferred heteroatoms include nitrogen, oxygen, phosphorus, and sulfur. Even more particularly preferred heteroatoms include oxygen and nitrogen. The heteroatom itself may be directly bound to the phenoxide ring or it may be bound to another atom or atoms that are bound to the phenoxide ring. The heteroatom containing group may contain one or more of the same or different heteroatoms. Preferred heteroatom groups include imines, amines, oxides, phosphines, ethers, ketenes, oxoazolines heterocyclics, oxazolines, thioethers, and the like. Particularly preferred heteroatom groups include imines. Any two adjacent R groups may form a ring structure, preferably a 5 or 6 membered ring. Likewise the R groups may form multi-ring structures. In one embodiment any two or more R groups do not form a 5 membered ring.

These phenoxide catalysts may be activated with activators including alkyl aluminum compounds (such as diethylaluminum chloride), alumoxanes, modified alumoxanes, non-coordinating anions, non-coordinating group 13 metal or metalliod anions, boranes, borates and the like. For further information on activators please see the ACTIVATOR section below.

This invention may also be practiced with the catalysts disclosed in EP 0 874 005 A1, which in incorporated by reference herein.

Activators

The catalysts, preferably the group 15 metal compound and/or the phenoxide catalysts described herein, are preferably combined with one or more activators to form olefin polymerization catalyst systems. Preferred activators include alkyl aluminum compounds (such as diethylaluminum chloride), alumoxanes, modified alumoxanes, non-coordinating anions, non-coordinating group 13 metal or metalliod anions, boranes, borates and the like. It is within the scope of this invention to use alumoxane or modified alumoxane as an activator, and/or to also use ionizing activators, neutral or ionic, such as tri (n-butyl) ammonium tetrakis (pentafluorophenyl) boron or a trisperfluorophenyl boron metalloid precursor which ionize the neutral metallocene compound. Other useful compounds include triphenyl boron, triethyl boron, tri-n-butyl ammonium tetraethylborate, triaryl borane and the like. Other useful compounds include aluminate salts as well.

In one embodiment modified alumoxanes are combined with the catalysts to form a catalyst system. In a preferred embodiment MMAO3A (modified methyl alumoxane in heptane, commercially available from Akzo Chemicals, Inc. under the trade name Modified Methylalumoxane type 3A, covered under U.S. Pat. No. 5,041,584) is combined with the first and second metal compounds to form a catalyst system. MMAO-4 and MMAO-12 may also be used.

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,041,584 5,693,838, 5,731,253, 5,041,584 and 5,731,451 and European publications EP-A-0 561 476, EP-B1-0 279 586 and EP-A-0 594-218, and PCT publication WO 94/10180, all of which are herein fully incorporated by reference.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197, 5,241,025, 5,387,568, 5,384,299, 5,502,124 and 5,643,847, all of which are herein fully incorporated by reference. Other activators include those described in PCT publication WO 98/07515 such as tris (2,2',2''-nonafluorobiphenyl) fluoroaluminate, which is fully incorporated herein by reference. Combinations of activators are also contemplated by the invention, for example, alumoxanes and ionizing activators in combinations, see for example, PCT publications WO 94/07928 and WO 95/14044 and U.S. Pat. Nos. 5,153,157 and 5,453,410 all of which are herein fully incorporated by reference. Also, methods of activation such as using radiation and the like are also contemplated as activators for the purposes of this invention.

When two different catalysts are used, the first and second catalyst compounds may be combined at molar ratios of 1:1000 to 1000:1, preferably 1:99 to 99:1, preferably 10:90 to 90:10, more preferably 20:80 to 80:20, more preferably 30:70 to 70:30, more preferably 40:60 to 60:40. The particular ratio chosen will depend on the end product desired and/or the method of activation. One practical method to determine which ratio is best to obtain the desired polymer is to start with a 1:1 ratio, measure the desired property in the product produced and adjust the ratio accordingly.

In some embodiments one or more of the catalyst metal compounds above may be used in combination with a bulky ligand metallocene compound (which is activated by the activators listed above.)

Bulky Ligand Metallocene-Type Compound

Bulky ligand metallocene-type compound (hereinafer also referred to as metallocenes) may also be used in the practice of this invention.

Generally, bulky ligand metallocene-type compounds include half and full sandwich compounds having one or more bulky ligands bonded to at least one metal atom. Typical bulky ligand metallocene-type compounds are generally described as containing one or more bulky ligand(s) and one or more leaving group(s) bonded to at least one metal atom. In one preferred embodiment, at least one bulky ligands is η-bonded to the metal atom, most preferably η$^5$-bonded to the metal atom.

The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system (s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene-type catalyst compounds are represented by the formula:

$$L^A L^B MQ_n \quad \text{(III)}$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/ or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of η-bonding to M, preferably η$^3$-bonding to M and most preferably η$^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (III) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that formula (III) above represents a neutral bulky ligand metallocene-type catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like.

The two L groups may be bridged together by group A as defined below.

In one embodiment, the bulky ligand metallocene-type catalyst compounds of the invention include those of formula (III) where $L^A$ and $L^B$ are bridged to each other by at least one bridging group, A, such that the formula is represented by $$L^A A L^B M Q_n \qquad (IV)$$

These bridged compounds represented by formula (IV) are known as bridged, bulky ligand metallocene-type catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si$ $R'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene-type catalyst compounds of formula (IV) have two or more bridging groups A (EP 664 301 B1).

In one embodiment, the bulky ligand metallocene-type catalyst compounds are those where the R substituents on the bulky ligands $L^A$ and $L^B$ of formulas (III) and (IV) are substituted with the same or different number of substituents on each of the bulky ligands. In another embodiment, the bulky ligands $L^A$ and $L^B$ of formulas (III) and (IV) are different from each other.

Other bulky ligand metallocene-type catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In one embodiment, bulky ligand metallocene-type catalysts compounds useful in the invention include bridged heteroatom, mono-bulky ligand metallocene-type compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057, 475, 5,096,867, 5,055,438, 5,198,401, 5,227,440 and 5,264, 405 and European publication EP-A-0 420 436, all of which are herein fully incorporated by reference.

In this embodiment, the bulky ligand metallocene-type catalyst compound is represented by the formula:

$$L^C A J M Q_n \qquad (V)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to M and J; J is a heteroatom ancillary ligand; and A is a bridging group; Q is a univalent anionic ligand; and n is the integer 0,1 or 2. In formula (V) above, $L^C$, A and J form a fused ring system. In an embodiment, $L^C$ of formula (V) is as defined above for $L^A$, A, M and Q of formula (V) are as defined above in formula (III).

In formula (V) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In an embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene-type catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In one embodiment, the bulky ligand metallocene-type catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene-type catalyst compounds are those described in PCT publications WO 99/01481 and WO 98/42664, which are fully incorporated herein by reference.

In a preferred embodiment, the bulky ligand type metallocene-type catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In a particularly preferred embodiment, the other metal compound or second metal compound is the bulky ligand metallocene-type catalyst compound is represented by the formula:

$$L^D M Q_2 (YZ) X_n \qquad (VI)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a ligand, preferably a unicharged polydentate ligand; A or Q is a univalent anionic ligand also bonded to M; X is a univalent anionic group when n is 2 or X is a divalent anionic group when n is 1; n is 1 or 2.

In formula (VI), L and M are as defined above for formula (III). Q is as defined above for formula (III), preferably Q is selected from the group consisting of —O—, —NR—, —$CR_2$— and —S—; Y is either C or S; Z is selected from the group consisting of —OR, —$NR_2$, —$CR_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

Spray-Drying

The metal compounds and/or the activators are then preferably combined with a particulate filler material and then spray dried, preferably to form a free flowing powder.

Spray drying may be by any means known in the art. Please see EPA 0 668 295 B1, U.S. Pat. Nos. 5,674,795 and 5,672,669 which particularly describe spray drying of supported catalysts. In general one may spray dry the catalysts by placing the metal catalyst compound and the activator in solution, allowing them to react, then adding a filler material such as silica or Cabosil™, then forcing the solution at high pressures through a nozel. The catalyst may be sprayed onto a surface or sprayed such that the droplets dry in midair. The method generally employed is to disperse the silica in toluene, stir in the activator solution, and then stir in the catalyst precursor solution. Typical slurry concentrations are about 5–8 wt %. This formulation may sit as a slurry for as long as 30 minutes with mild stirring or manual shaking to keep it as a suspension before spray-drying. In one preferred embodiment, the makeup of the dried material is about 40–50 wt % activator, (preferably alumoxane), 50–60 SiO$_2$ and about ~2 wt % metal catalyst compound.

For simple metal catalyst compound mixtures, the two or more metal catalyst compounds can be added together in the desired ratio in the last step. In another embodiment, more complex procedures are possible, such as addition of a first metal catalyst compound to the activator/filler mixture for a specified reaction time t, followed by the addition of the second metal catalyst compound solution, mixed for another specified time x, after which the mixture is cosprayed. Lastly, another additive, such as 1-hexene in about 10 vol % can be present in the activator/filler mixture prior to the addition of the first metal catalyst compound.

In another embodiment a bulky ligand metallocene type compound and optional activator can be combined with the spray dried catalysts of this invention and then introduced into a reactor.

In another embodiment binders are added to the mix. These can be added as a means of improving the particle morphology, i.e. narrowing the particle size distribution, lower porosity of the particles and allowing for a reduced quantity of alumoxane, which is acting as the 'binder'.

Polymerization Process of the Invention

The catalysts and catalyst systems described above are suitable for use in the polymerization process of the invention. The polymerization process of the invention includes a solution, gas or slurry process or a combination thereof, most preferably a gas or slurry phase process.

In an embodiment, this invention is directed toward the slurry or gas phase polymerization or copolymerization reactions involving the polymerization of one or more monomers having from 2 to 30 carbon atoms, preferably 2–12 carbon atoms, and more preferably 2 to 8 carbon atoms. The invention is particularly well suited to the copolymerization reactions involving the polymerization of one or more olefin monomers of ethylene, propylene, butene-1, pentene-1, 4-methyl-pentene-1, hexene-1, octene-1, decene-1, 3-methyl-pentene-1, 3,5,5-trimethyl-hexene-1 and cyclic olefins or a combination thereof. Other monomers can include vinyl monomers, diolefins such as dienes, polyenes, norbornene, norbornadiene monomers. Preferably a copolymer of ethylene is produced, where the comonomer is at least one alpha-olefin having from 4 to 15 carbon atoms, preferably from 4 to 12 carbon atoms, more preferably from 4 to 8 carbon atoms and most preferably from 4 to 7 carbon atoms. In an alternate embodiment, the geminally disubstituted olefins disclosed in WO 98/37109 may be polymerized or copolymerized using the invention herein described.

In another embodiment ethylene or propylene is polymerized with at least two different comonomers to form a terpolymer. The preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, propylene/ethylene/hexene-1, ethylene/propylene/norbornene and the like.

In a particularly preferred embodiment the process of the invention relates to the polymerization of ethylene and at least one comonomer having from 4 to 8 carbon atoms, preferably 4 to 7 carbon atoms. Particularly, the comonomers are butene-1, 4-methyl-pentene-1, hexene-1 and octene-1, the most preferred being hexene-1 and/or butene-1.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 10 psig (69 kPa) to about 500 psig (3448 kPa), preferably in the range of from about 100 psig (690 kPa) to about 400 psig (2759 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C.

The productivity of the catalyst or catalyst system is influenced by the main monomer partial pressure. The preferred mole percent of the main monomer, ethylene or propylene, preferably ethylene, is from about 25 to 90 mole percent and the monomer partial pressure is in the range of from about 75 psia (517 kPa) to about 300 psia (2069 kPa), which are typical conditions in a gas phase polymerization process.

In a preferred embodiment, the reactor utilized in the present invention and the process of the invention produce greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 185° F. (85° C.) to about 230° F. (110° C.). Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst as a slurry in isobutane or as a dry free flowing powder is injected regularly to the reactor loop, which is itself filled with circulating slurry of growing polymer particles in a diluent of isobutane containing monomer and comonomer. Hydrogen, optionally, may be added as a molecular weight control. The reactor is maintained at pressure of about 525 psig to 625 psig (3620 kPa to 4309 kPa) and at a temperature in the range of about 140° F. to about 220° F. (about 60° C. to about 104° C.) depending on the desired polymer density. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process of the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process of the invention the concentration of ethylene in the reactor liquid medium is in the range of from about 1 to 10 weight percent, preferably from about 2 to about 7 weight percent, more preferably from about 2.5 to about 6 weight percent, most preferably from about 3 to about 6 weight percent.

A preferred process of the invention is where the process, preferably a slurry or gas phase process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. No. 5,712,352, which are herein fully incorporated by reference.

In another preferred embodiment the one or all of the catalysts are combined with up to 10 weight % of a metal stearate, (preferably a aluminum stearate, more preferably aluminum distearate) based upon the weight of the catalyst, any support and the stearate, preferably 2 to 3 weight %. In an alternate embodiment a solution of the metal stearate is fed into the reactor. In another embodiment the metal stearate is mixed with the catalyst and fed into the reactor separately. These agents may be mixed with the catalyst or may be fed into the reactor in a solution with or without the catalyst system or its components.

In a preferred embodiment, the polyolefin recovered typically has a melt index as measured by ASTM D-1238, Condition E, at 190° C. of 3000 g/10 min or less. In a preferred embodiment the polyolefin is ethylene homopolymer or copolymer. IN a preferred embodiment for certain applications, such as films, molded article and the like a melt index of 100 g/10 min or less is preferred. For some films and molded article a melt index of 10 g/10 min is preferred. In a preferred embodiment the polymer produced has a molecular weight of 200,000 Daltons or more.

In a preferred embodiment the catalyst system described above is used to make a polyethylene having a density of between 0.88 and 0.970 g/cm$^3$ (as measured by ASTM 2839), a melt index of 1.0 or less g/10 min or less (as measured by ASTM D-1238, Condition E, at 190° C.). Polyethylene having a melt index of between 0.01 to 10 dg/min is preferably produced. In some embodiments, a density of 0.915 to 0.940 g/cm$^3$ would be preferred, in other embodiments densities of 0.930 to 0.960 g/cm$^3$ are preferred.

The polyolefins then can be made into films, molded articles, sheets, wire and cable coating and the like. The films may be formed by any of the conventional technique known in the art including extrusion, co-extrusion, lamination, blowing and casting. The film may be obtained by the flat film or tubular process which may be followed by orientation in an uniaxial direction or in two mutually perpendicular directions in the plane of the film to the same or different extents. Orientation may be to the same extent in both directions or may be to different extents. Particularly preferred methods to form the polymers into films include extrusion or coextrusion on a blown or cast film line.

The films produced may further contain additives such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, calcium stearate, zinc stearate, talc, $BaSO_4$, diatomaceous earth, wax, carbon black, flame retarding additives, low molecular weight resins, hydrocarbon resins, glass beads and the like. The additives may be present in the typically effective amounts well known in the art, such as 0.001 weight % to 10 weight %.

This invention further relates to a library of a plurality of metal compounds represented by the formula above. These libraries may then be used for the simultaneous parallel screening of catalysts by combining the library with one or more olefins, preferably in order to determine the relative capabilities of the different compounds.

EXAMPLES

Mn and Mw were measured by gel permeation chromatography on a waters 150° C. GPC instrument equipped with differential refraction index detectors. The GPC columns were calibrated by running a series of narrow polystyrene standards and the molecular weights were calculated using Mark Houwink coefficients for the polymer is question.
Density was measured according to ASTM D 1505.
Melt Index (MI) $I_2$ and $I_{21}$ were measured according to ASTM D-1238, Condition E, at 190° C.
Melt Index Ratio (MIR) is the ratio of $I_{21}$ over $I_2$ as determined by ASTM D-1238.
Weight % comonomer was measured by proton NMR.
MWD=Mw/Mn
A={[(2,4,6-Me$_3$C$_6$H$_2$)NCH$_2$CH$_2$]$_2$NH}ZrBz$_2$
B=[(2-Me-naphthyl)NCH$_2$CH$_2$]$_2$NH]ZrBz$_2$
C={[(2,4,6-Me$_3$C$_6$H$_2$)NCH$_2$CH$_2$]$_2$NH}HfBz$_2$

Example 1

Preparation of [(2,4,6-Me$_3$C$_6$H$_2$)NHCH$_2$CH$_2$]$_2$NH Ligand

A 2 L one-armed Schlenk flask was charged with a magnetic stir bar, diethylenetriamine (23.450 g, 0.227 mol), 2-bromomesitylene (90.51 g, 0.455 mol), tris(dibenzylideneacetone)dipalladium (1.041 g, 1.14 mol), racemic-2,2'-bis(diphenylphosphino)-1,1'-binaphthyl (racemic BINAP) (2.123 g, 3.41 mmol), sodium tert-butoxide (65.535 g, 0.682 mol), and toluene (800 mL) under dry, oxygen-free nitrogen. The reaction mixture was stirred and heated to 100 C. After 18 h the reaction was complete, as judged by proton NMR spectroscopy. All remaining manipulations can be performed in air. All solvent was removed under vacuum and the residues dissolved in diethyl ether (1 L). The ether was washed with water (3×250 mL) followed by saturated aqueous NaCl (180 g in 500 mL) and dried over magnesium sulfate (30 g). Removal of the ether in vacuo yielded a red oil which was dried at 70 C. for 12 h under vacuum (yield: 71.10 g, 92%). $^1$H NMR (C$_6$D$_6$) δ6.83 (s, 4), 3.39 (br s, 2), 2.86 (t, 4), 2.49 (t, 4), 2.27 (s, 12), 2.21 (s, 6), 0.68 (br s, 1).

Example 2

Preparation of Catalyst A

Preparation of {[(2,4,6-Me$_3$C$_6$H$_2$)NCH$_2$CH$_2$]NH}Zr(CH$_2$Ph)$_2$

A 500 mL round bottom flask was charged with a magnetic stir bar, tetrabenzyl zirconium (Boulder Scientific) (41.729 g, 91.56 mmol), and 300 mL of toluene under dry, oxygen-free nitrogen. Solid HN3 ligand (example 1) (32.773 g, 96.52 mmol) was added with stirring over 1 minute (the desired compound precipitates). The volume of the slurry was reduced to 100 mL and 300 mL of pentane added with stirring. The solid yellow-orange product was collected by filtration and dried under vacuum (44.811 g, 80% yield). $^1$H NMR (C$_6$D$_6$) δ7.22–6.81 (m, 12), 5.90 (d, 2), 3.38 (m, 2), 3.11 (m, 2), 3.01 (m, 1), 2.49 (m, 4), 2.43 (s, 6), 2.41 (s, 6) 2.18 (s, 6), 1.89 (s, 2), 0.96 (s, 2).

Example 3

Preparation of Catalyst C

Preparation of {[(2,4,6-Me$_3$C$_6$H$_2$)NCH$_2$CH$_2$]$_2$NH}Hf(CH$_2$Ph)$_2$)

A 250 mL round bottom flask was charged with a magnetic stir bar, tetrabenzyl hafnium (4.063 g, 7.482 mmol), and 150 mL of toluene under dry, oxygen-free nitrogen. Solid HN3 ligand (Example 1) (2.545 g, 7.495 mmol) was added with stirring over 1 minute (the desired compound precipitates). The volume of the slurry was reduced to 30 mL and 120 mL of pentane added with stirring. The solid pale yellow product was collected by filtration and dried under vacuum (4.562 g, 87% yield). $^1$H NMR (C$_6$D$_6$) δ7.21–6.79 (m, 12), 6.16 (d, 2), 3.39 (m, 2), 3.14 (m, 2), 2.65 (s, 6), 2.40 (s, 6), 2.35 (m, 2), 2.23 (m, 2), 2.19 (s, 6) 1.60 (s, 2), 1.26 (s, 2), NH obscured.

Example 4

Preparation of [(2-methylnaphthyls)NHCH$_2$CH$_2$]$_2$NH Ligand

A 1 L one-armed Schlenk flask was charged with a magnetic stir bar, diethylenetriamine (6.026 g, 58.41 mmol), 2-bromo-2-methylnaphthylene (25.829 g, 116.8 mmol), tris(dibenzylidene-acetone)dipalladium (0.268 g, 0.292 mmol), racemic-2,2'-bis(diphenylphosphino)-1,1'-binaphthyl (racemic BINAP) (0.547 g, 0.878 mmol), sodium tert-butoxide (16.90 g, 175.8 mmol), and toluene (400 mL) under dry, oxygen-free nitrogen. The reaction mixture was stirred and heated to 100 C. After 18 h the reaction was complete, as judged by proton NMR spectroscopy. All remaining manipulations can be performed in air. All solvent was removed under vacuum and the residues dissolved in diethyl ether (500 mL). The ether was washed with water (3×100 mL) followed by saturated aqueous NaCl (90 g in 250 mL) and dried over magnesium sulfate (15 g). Removal of the ether in vacuo yielded a red oil which was dried at 70 C. for 12 h under vacuum (yield: 19.10 g, 85%). $^1$HNMR (C$_6$D$_6$) δ8.32 (d, 2), 7.71 (d, 2), 7.40–7.18 (m, 8), 3.91 (t, 2), 2.99 (dt, 4), 2.41 (dt, 4), 2.30 (s, 6), 0.69 (pentet, 1).

Example 5

Preparation of Catalyst C

Preparation of {[(2-methylnaphthyl)NCH$_2$CH$_2$]$_2$NH}Zr(CH$_2$Ph)$_2$

A 500 mL round bottom flask was charged with a magnetic stir bar, tetrabenzyl zirconium (Boulder Scientific)

(3.000 g, 6.582 mmol), and 300 mL of toluene under dry, oxygen-free nitrogen. A solution HN3-2 ligand (Example 4) (65 mL, 0.102 M, 6.63 mmol) was added with stirring over 1 minute (the desired compound precipitates). The volume of the slurry was reduced to 40 mL and 150 mL of pentane added with stirring. The solid yellow-orange product was collected by filtration and dried under vacuum (3.060 g, 71% yield). The product is a mixture of four isomers resulting from the orientation of the 2-methylnaphthyl groups. $^1$H NMR (C$_6$D$_6$) δ8.50 (d), 8.39 (d), 8.35 (d), 7.70 (d), 7.66–6.70 (m), 6.53 (t), 6.22 (t), 5.63 (m), 5.18 (d), 4.70 (d), 3.62 (m), 3.50 (m), 3.30–3.11 (m), 2.68 (m), 2.60 (s), 2.55 (m), 2.52 (s), 2.50 (s), 2.10 (s), 1.61 (s), 1.29 (AB quartet), 1.03 (s), 1.01 (s), 1.00 (AB quartet), other resonances obscured.

Example 6

Synthesis of [ortho-3,5-di-t-Bu-(C$_6$H$_2$)(OH)CH═NCHMe$_2$]

3,5-Di-t-butylsalicylaldehyde (3.00 g) was added to 10 mL of iso-propylamine. The solution rapidly turned bright yellow. After stirring at ambient temperature for 3 hours, volatiles were removed under vacuum to yield a bright yellow, crystalline solid (97% yield).

Example 7

Preparation of Catalyst D

Synthesis of {[ortho-3,5-di-t-Bu-(C$_6$H$_2$)(O)CH═NCHMe$_2$]$_2$Zr(CH$_2$Ph)$_2$.

A solution of N-iso-Pr-3,5-di-t-butylsalicylimine (605 mg, 2.2 mmol) in 5 mL toluene was slowly added to a solution of Zr(CH$_2$Ph)$_4$ (500 mg, 1.1 mmol) in 50 mL toluene. The resulting dark yellow solution was stirred for 30 min. Solvent was removed in vacuo to yield a reddish-brown solid. $^1$H NMR (C$_6$D$_6$) δ8.07 (s, HC═N, 1H), 7.77 (d, J=2.4 Hz, salicylimine), 7.1–6.95 (m, 5H, aryl), 6.73 (t, J=7.2 Hz, 1H, benzyl), 4.17 (septet, J=6.6 Hz, 1H, CHMe$_2$), 2.76 (AB, J=10.2 Hz, 2H, ZrCH$_2$Ph), 1.78 (s, 9H, t-Bu), 1.29 (s, 9H, t-Bu), 0.76 (d, J=6.6 Hz, 3H, NCHMe$_A$Me$_B$), 0.52 (d, J=6.6 Hz, 3H, NCHMe$_A$Me$_B$).

Catalyst 1. Spray-Drying of {[(2,4,6-Me$_3$C$_6$H$_2$)NCH$_2$CH$_2$]$_2$NH}ZrBZ$_2$ To 110 mls of toluene was added to 5.0 gms of Cabosil TS-610, dehydrated under vacuum above 100° C. To this slurry was added a solution of methylalumoxane (26 mls of 20 wt % MAO in toluene). A catalyst precursor solution of 0.075 gms [(2,4,6-Me$_3$C$_6$H$_2$)NCH$_2$CH$_2$]$_2$NH]ZrBz$_2$ in about 20 mls toluene was added to the slurry, and stirred/swirled for about 30 minutes. This mixture was spray dried in a Buchi Series 190 Mini Spray Dryer, contained in an inert atmosphere drybox. The following conditions were employed: a 0.7 mm diameter spray nozzle cap, a 0.5 mm mixing needle, nitrogen gas flowing at 16.7 L/min for spray-flow, an aspirator setting at 20, 120° C. inlet temperature, 80 to 90° C. outlet temperature, and 0.6 L/hr catalyst mixture feed. The solids collected totaled 6.55 gms (68%). ICP indicated 0.13 wt % Zr and an Al:Zr ratio of 536:1.

Catalyst 2. Spray-Drying of {[(2-Me-Naphthyl)NCH$_2$CH$_2$]$_2$NH}ZrBz$_2$

To 110 mls of toluene was added to 5.0 gms of Cabosil TS-610, dehydrated under vacuum above 100° C. To this slurry was added a solution of methylalumoxane (26 mls of 20 wt % MAO in toluene). A catalyst precursor solution of 0.083 gms [(2-Me-naphthyl)NCH$_2$CH$_2$]$_2$NH]ZrBz$_2$ in about 20 mls toluene was added to the slurry, and stirred/swirled for about 30 minutes. This mixture was spray dried as above. The solids collected totaled 5.77 gms (59%). ICP indicated 0.15 wt % Zr and an Al:Zr ratio of 458:1.

Catalyst 3. Spray-Drying of {[(2,4,6-Me$_3$C$_6$H$_2$)NCH$_2$CH$_2$]$_2$NH}ZrBz$_2$ To 110 mls of toluene was added to 4.0 gms of Cabosil TS-610, dehydrated under vacuum above 100° C. To this slurry was added a solution of methylalumoxane (26 mls of 20 wt % MAO in toluene). A catalyst precursor solution of 0.20 gms [(2,4,6-Me$_3$C$_6$H$_2$)NCH$_2$CH$_2$]$_2$NH]ZrBz$_2$ in about 20 mls toluene was added to the slurry, and stirred/swirled for about 30 minutes. This mixture was spray dried as above. The solids collected totaled 5.18 gms (58%). ICP indicated 0.36 wt % Zr and an Al:Zr ratio of 196:1.

Catalyst 4. Spray-Drying of {[(2,4,6-Me$_3$C$_6$H$_2$)NCH$_2$CH$_2$]$_2$NH}HfBz$_2$ To 140 mls of toluene was added 4.6 gms of Cabosil TS-610, dehydrated under vacuum above 100° C. To this slurry was added a solution of methylalumoxane (20.8 mls of 20 wt % MAO in toluene). A catalyst precursor solution of 0.229 gms [(2,4,6-Me$_3$C$_6$H$_2$)NCH$_2$CH$_2$]$_2$NH]HfBz$_2$ in about 20 mls toluene was added to the slurry, and stirred/swirled for about 30 minutes. This mixture was spray dried as above.

Catalyst 5. Spray-Drying of {[(2,4,6-Me$_3$C$_6$H$_2$)NCH$_2$CH$_2$]$_2$NH}ZrBz$_2$ To 280 mls of toluene was added to 12.4 gms of Cabosil TS-610, dehydrated under vacuum above 100° C. To this slurry was added a solution of methylalumoxane (57 mls of 20 wt % MAO in toluene). A catalyst precursor solution of 0.55 gms [(2,4,6-Me$_3$C$_6$H$_2$)NCH$_2$CH$_2$]$_2$NH]ZrBz$_2$ in about 20 mls toluene was added to the slurry, and stirred/swirled for about 30 minutes. This mixture was spray dried as above. The solids collected totaled 13 gms (56%). ICP indicated 0.38 wt % Zr and an Al:Zr ratio of 152:1.

Catalyst 6. Spray-Drying of {[(2,4,6-Me$_3$C$_6$H$_2$)NCH$_2$CH$_2$]$_2$NH}HfBz$_2$ To 125 mls of toluene was added 6.0 gms of Cabosil TS-610, dehydrated under vacuum above 100° C. To this slurry was added a solution of methylalumoxane (27 mls of 20 wt % MAO in toluene). A catalyst precursor solution of 0.30 gms [(2,4,6-Me$_3$C$_6$H$_2$)NCH$_2$CH$_2$]$_2$NH]HfBz$_2$ in about 20 mls toluene was added to the slurry, and stirred/swirled for about 30 minutes. This mixture was spray dried as above. The solids collected totaled 7.0 gms (63%). ICP indicated 0.72 wt % Hf and an Al:Hf ratio of 120: 1.

Catalyst 7. Spray-Drying of {[ortho-3,5-di-t-Bu-(C$_6$H$_2$)(O)CH═NCHMe$_2$]$_2$}Zr(CH$_2$Ph)$_2$ To 75 mls of toluene was added 2.6 gms of Cabosil TS-610, dehydrated under vacuum above 100° C. To this slurry was added a solution of methylalumoxane (12.4 mls of 20 wt % MAO in toluene). A catalyst precursor solution of 0.168 gms {[ortho-3,5-di-t-Bu-(C$_6$H$_2$)(O)CH═NCHMe$_2$]$_2$}Zr(CH$_2$Ph)$_2$ in about 20 mls toluene was added to the slurry, and stirred/swirled for about 30 minutes. This mixture was spray dried as above.

Catalyst 8. Spray-Drying of 1:1 {[(2,4,6-Me$_3$C$_6$H$_2$)NCH$_2$CH$_2$]$_2$NH}ZrBz$_2$ and (n-C$_3$H$_7$-C$_5$H$_4$)(Me$_5$C)ZrCl$_2$ To 110 mls of toluene was added 4.0 gms of Cabosil TS-610, dehydrated under vacuum above 100° C. To this slurry was added a solution of methylalumoxane (26 mls of 20 wt % MAO in toluene). A catalyst precursor solution of 0.10 gms {[(2,4,6-Me$_3$C$_6$H$_2$)NCH$_2$CH$_2$]$_2$NH}ZrBz$_2$ and 0.067 gms (n-C$_3$H$_7$-C$_5$H$_4$)(Me$_5$C)ZrCl$_2$ in about 20 mls toluene was added to the slurry, and stirred/swirled for about 30 minutes. This mixture was spray dried as above. The solids collected totaled 5.31 gms (60%). ICP indicated 0.37 wt % Zr and an Al:Zr ratio of 202:1.

Catalyst 9. Spray-Drying of 1:1 {[(2,4,6-Me$_3$C$_6$H$_2$)NCH$_2$CH$_2$]$_2$NH}ZrBz$_2$ and (n-C$_3$H$_7$-C$_5$H$_4$)$_2$ZrCl$_2$ To 110 mls of toluene was added 4.0 gms of Cabosil TS-610, dehydrated under vacuum above 100° C. To this slurry was added a solution of methylalumoxane (26 mls of 20 wt % MAO in toluene). A catalyst precursor solution of 0.10 gms {[(2,4,6-Me$_3$C$_6$H$_2$)NCH$_2$CH$_2$]$_2$NH}ZrBz$_2$ and 0.056 gms (n-C$_3$H$_7$-C$_5$H$_4$)$_2$ZrCl$_2$ in about 20 mls toluene was added to the slurry, and stirred/swirled for about 30 minutes. This mixture was spray dried as above.

Catalyst 10. Spray-Drying of 3.4:1 {[(2,4,6-Me$_3$C$_6$H$_2$) NCH$_2$CH$_2$]$_2$NH}ZrBz$_2$ and (n-C$_3$H$_7$-C$_5$H$_4$)$_2$ZrCl$_2$ To 540 mls of toluene was added 21.4 gms of Cabosil TS-610, dehydrated under vacuum above 100° C. To this slurry was added a solution of methylalumoxane (97 mls of 20 wt % MAO in toluene). A catalyst precursor solution of 0.80 gms {[(2,4,6-Me$_3$C$_6$H$_2$)NCH$_2$CH$_2$]$_2$NH}ZrBz$_2$ and 0.143 gms (n-C$_3$H$_7$-C$_5$H$_4$)$_2$ZrCl$_2$ in about 60 mls toluene was added to the slurry, and stirred/swirled for about 30 minutes. This mixture was spray dried as above. The solids collected totaled 21 gms (53%). ICP indicated 0.44 wt % Zr and an Al:Zr ratio of 128.

Catalyst 11. Spray-Drying of 5:1 {[(2,4,6-Me$_3$C$_6$H$_2$) NCH$_2$CH$_2$]$_2$NH}ZrBz$_2$ and (n-C$_3$H$_7$-C$_5$H$_4$)$_2$ZrCl$_2$ To 570 mls of toluene was added 25.8 gms of Cabosil TS-610, dehydrated under vacuum above 100° C. To this slurry was added a solution of methylalumoxane (116 mls of 20 wt % MAO in toluene). A catalyst precursor solution of 0.93 gms {[(2,4,6-Me$_3$C$_6$H$_2$)NCH$_2$CH$_2$]$_2$NH}ZrBz$_2$ and 0.114 gms (n-C$_3$H$_7$-C$_5$H$_4$)$_2$ZrCl$_2$ in about 40 mls toluene was added to the slurry, and stirred/swirled for about 30 minutes. This mixture was spray dried as above. The solids collected totaled 29 gms (60%). ICP indicated 0.39 wt % Zr and an Al:Zr ratio of 156.

Catalyst 12. Spray-Drying of 3:1 {[(2,4,6-Me$_3$C$_6$H$_2$) NCH$_2$CH$_2$]$_2$NH}HfBz$_2$ and (n-C$_3$H$_7$-C$_5$H$_4$)$_2$ZrCl$_2$ To 570 mls of toluene was added 25.8 gms of Cabosil TS-610, dehydrated under vacuum above 100° C. To this slurry was added a solution of methylalumoxane (116 mls of 20 wt % MAO in toluene). A catalyst precursor solution of 0.96 gms {[(2,4,6-Me$_3$C$_6$H$_2$)NCH$_2$CH$_2$]$_2$NH}HfBz$_2$ and 0.17 gms (n-C$_3$H$_7$-C$_5$H$_4$)$_2$ZrCl$_2$ in about 40 mls toluene was added to the slurry, and stirred/swirled for about 30 minutes. This mixture was spray dried as above. The solids collected totaled 32 gms (67%). ICP indicated 0.51 wt % Hf, 0.094 wt % Zr and an Al:M ratio of 161.

Polymerization Examples 1–15

Polymerizations in a slurry reactor were conducted as follows. After an appropriate bake-out period and subsequent cool-down under nitrogen, 490 cc's of hexanes were charged to a 1 liter autoclave reactor. Hexene, if any, and 0.17 cc's of 0.87 mmolar triisobutylaluminum in heptane as scavenger, and hydrogen, if any, were added to the reactor prior to heating. The reactor contents were heated to the desired temperature. Spray dried catalyst was loaded into a 10 cc bomb which was fitted to a 20 cc bomb to which was added 10 cc's of hexanes. Each bomb was pressurized with nitrogen prior to attaching to the reactor. The spray-dried catalyst was injected under pressure into the reactor, followed immediately by release of the hexanes. In this manner, quantitative delivery could be assured. Ethylene immediately filled the system and was fed on demand thereafter. Polymerizations were conducted for 30 minutes.

Comparative Polymerizations

The reactor was prepared and charged with hexane, hexene, hydrogen, and scavenger as above. The following preparation for Comparative 1 is general: A stock solution of 2.1 mg of {[(2,4,6-Me$_3$C$_6$H$_2$)NCH$_2$CH$_2$]$_2$NH}ZrBz$_2$ was dissolved in 4.5 cc's of toluene. A 0.50 cc aliquot was removed and added to 0.50 cc of 0.5 M methylaluminoxane (MAO) in toluene. The solutions were mixed for about five minutes prior to injection into the reactor at the desired, after which ethylene was immediately introduced and fed on demand thereafter. All polymerizations were conducted for 30 minutes.

The data are reported in the following table.

| Ex. | Catalyst | umol M | storage (days) | Al/Zr | rxn temp (° C.) | cc H2 | cc C6 | C2 PP | gms PE | activity[1] | $I_{21}^2$ | Mw x $10^5$ | PDI[3] |
|---|---|---|---|---|---|---|---|---|---|---|---|---|---|
| 1 | 1 | 0.38 | 15 | | 65 | 0 | 0 | 128 | 45.7 | 187900 | | | |
| 2 | 1 | 0.38 | 15 | | 65 | 0 | 0 | 77 | 34.2 | 233800 | | | |
| 3 | 1 | 0.50 | 33 | | 65 | 0 | 20 | 60 | 27.9 | 186000 | 10.3 | 1.98 | 4.01 |
| 4 | 1 | 0.50 | 34 | | 65 | 0 | 10 | 56 | 28.1 | 200700 | 2.36 | 3.07 | 5.55 |
| 5 | 1 | 0.38 | 55 | | 65 | 0 | 0 | 62 | 23.8 | 202000 | | | |
| 6 | 1 | 0.50 | 56 | | 85 | 0 | 0 | 60 | 12.2 | 81300 | 051 | | |
| 7 | 2 | 2.3 | | | 65 | 0 | 0 | 128 | 10.3 | 7000 | | | |
| 8 | 2 | 3.0 | | | 65 | 0 | 20 | 129 | 12.4 | 6400 | | | |
| 9 | 3 | 0.50 | | | 65 | 0 | 0 | 57 | 24.3 | 170500 | | | |
| 10 | 3 | 0.50 | | | 65 | 0 | 10 | 58 | 24.6 | 169700 | 1.67 | 3.14 | 4.51 |
| 11 | 3 | 0.50 | | | 85 | 0 | 0 | 55 | 18.4 | 133800 | | | |
| 12 | 8 | 0.50 | | | 65 | 0 | 0 | 55 | 26.6 | 193400 | nf | | |
| 13 | 8 | 0.50 | | | 65 | 0 | 10 | 57 | 21.9 | 153700 | 1.29 | 3.21 | 3.81 |
| 14 | 8 | 0.50 | | | 85 | 0 | 0 | 54 | 9.9 | 73300 | nf | | |
| 15 | 9 | 0.50 | | | 65 | 100 | 0 | 65 | 8.7 | 53500 | | | |
| Comp1 | A | 0.38 | | 667 | 65 | 0 | 0 | 62 | 22.1 | 187600 | | | |
| Comp2 | A | 0.38 | | 667 | 65 | 0 | 20 | 60 | 29.1 | 255300 | | | |
| Comp3 | B | 3.0 | | 500 | 65 | 0 | 0 | 135 | 3.2 | 1580 | | | |
| Comp4 | B | 3.0 | | 500 | 65 | 0 | 20 | 135 | 3.2 | 1580 | | | |

[1]Activity units gms PE mmol M$^{-1}$ hr$^{-1}$ 100 psi C2$^{-1}$.
[2]nf = no flow.
[3]PDI = Mw/Mn.
A = {[(2,4,6-Me$_3$C$_6$H$_2$)NCH$_2$CH$_2$]$_2$NH}ZrBz$_2$ injected as a MAO activated solution.
B = [(2-Me-naphthyl)NCH$_2$CH$_2$]$_2$NH]ZrBz$_2$ injected as a MAO activated solution Polymerization Examples 16–21

After appropriate bake-out of a 4L side-agitated laboratory gas-phase reactor and cool-down under nitrogen, the reactor was charged with Davison 955–600 silica as starting bed. Hydrogen, 1-hexene, and scavenger were added prior to heating to 85° C. Where added, hydrogen was charged by filling a 50 cc bomb to 150 psig (1.03 MPa) with 5% $H_2/N_2$ and discharging it to the reactor at slightly above ambient pressure. Spray-dried catalysts were injected into the reactor using the same device as was used for catalyst injection into the slurry reactor. Immediately upon catalyst injection, ethylene was introduced into the reactor and fed on demand for the remainder of the run. Ethylene partial pressure was 100 psig (0.69 MPa).

Comparative Polymerizations

Supported catalysts were run identically as above. Solution catalysts were injected in the same manner as for the slurry polymerizations. The data are reported in the following table.

| example | catalyst/ precursor | umol M | Al/M | $H_2$ | TIBA mls | C6 mls | silica gms | PE gms | time min |
|---|---|---|---|---|---|---|---|---|---|
| 16 | 4 | 4.0 | | none | 5 | 1.2 | 30 | 210 | 66 |
| 17 | 4 | 2.0 | | yes | 4 | 0.6 | 30 | 141 | 94 |
| 18 | 5 | 4.0 | | none | 5 | 1.2 | 50 | 120 | 60 |
| 19 | 5 | 20 | | yes | 4 | 0.6 | 30 | 107 | 75 |
| 20 | 7 | 2.0 | | yes | 4 | 0.6 | 30 | 148 | 60 |
| 21 | 8 | 2.0 | | yes | 4 | 0.6 | 30 | 174 | 62 |
| comp 5 | C | 2.0 | 120 | yes | 4 | 0.6 | 30 | 31 | 60 |
| comp 6 | C | 2.0 | 200 | yes | 4 | 0.6 | 30 | 56 | 132 |
| comp 7 | C' | 2.0 | 120 | yes | 4 | 0.6 | 30 | 38 | 62 |
| comp 8 | D | 2.0 | 200 | yes | 4 | 0.6 | 30 | 15 | 60 |

C = {[(2,4,6-Me$_3$C$_6$H$_2$)NCH$_2$CH$_2$]$_2$NH}HfBz$_2$ injected as a MAO activated solution.
C' = {[(2,4,6-Me$_3$C$_6$H$_2$)NCH$_2$CH$_2$]$_2$NH}HfBz$_2$ supported on Davison 948 silica, 0.38 μmol Hf/gm, Al/Hf = 120.
D = {[ortho-3,5-di-t-Bu-(C$_6$H$_2$)(O)CH=NCHMe$_2$]$_2$Zr(CH$_2$Ph)$_2$ injected as a MAO activated solution.

Polymerization Examples 22–28
Polymerization Procedure

In Comparative 9 and Examples 22 through 28, polyethylene was prepared in a stirred bed, horizontally mixed reactor with various catalyst compositions. The Table below summarizes the polymerization conditions for each example.

FIG. 1 depicts the horizontally mixed reactor system used in Comparative 9 and Examples 22 through 28. The reactor was a two-phase (gas/solid) stirred bed, back-mixed reactor. A set of four "plows" 100 were mounted horizontally on a central shaft rotating at 180 rpm to keep the particles in reactor 110 mechanically fluidized. The reactor cylinder swept by these plows measured 40.6 cm (16 in.) long by 39.7 cm (15.6 in.) in diameter, resulting in a mechanically fluidizable volume of 46 liters (1.6 ft$^3$). The gas volume, larger than the mechanically fluidizable volume due to the vertical cylindrical chamber, totaled 54.6 liters (1.93 ft$^3$).

The reactor pressure in each example was 2.4 MPa. Ethylene monomer, hexene comonomer and hydrogen (for molecular weight control) were fed to the reactor continuously via control valves through line 120. The partial pressure of ethylene monomer was 1.5 Mpa. Comonomer content in the polyethylene product was controlled by adjusting feed rates to maintain a constant comonomer/ monomer molar ratio (shown in the Table) in the gas phase. Gas composition was measured at 1–4 minute intervals by a gas chromatographic analyzer. Molecular weight of the polyethylene was controlled by adjusting the hydrogen feed rate to maintain a constant mole ratio of hydrogen to monomer in the gas phase. Nitrogen made up the majority of the balance of the composition of the gas in the reactor, entering with the catalyst composition through line 130 and leaving via a small vent 140 with the reactor gases including volatilized solvents. The vent opening was adjusted via computer to maintain constant total pressure in the reactor.

The reactor was cooled by an external jacket of chilled glycol. The bed temperature was measured with a temperature probe 150 in a thermowell protruding into the bed at a 60° angle above horizontal, between the inner set of plows. The reactor temperature in Comparative 9 was 85° C., while the reactor temperature in Examples 22 through 28 was 80° C.

For Comparative 9, a solution of catalyst was prepared by mixing Catalyst A in toluene and the resulting solution was stored in a reservoir connected to line 160. The solution of catalyst was metered in shots via line 160 and mixed with a continuous stream of modified methylaluminoxane cocatalyst solution introduced via line 170. The concentration of Akzo MMAO type 3A in isopentane was 2.1% and the amount of the MMAO used was such that the Al/Zr ratio in the reactor was 200. The mixture of catalyst and MMAO solutions were fed through a coil 180 of ⅛ inch (0.32 cm) tubing where the catalyst and the cocatalyst reacted for approximately 4 minutes. Upon leaving this pre-contact coil, the mixed solution of catalyst composition was sprayed into the reactor by a constant flow of nitrogen from line 130.

For Examples 22 through 28, a slurry of spray-dried catalyst was prepared by mixing the catalyst powder with light mineral oil, and the resulting slurry was stored in an agitated reservoir connected to line 160. The slurry of catalyst was metered in shots via line 160 and mixed with a continuous stream of modified methylaluminoxane cocatalyst solution introduced via line 170. For these examples, coil 180 was replaced with a straight piece of ⅛" o.d. tubing approximately 4" long. The concentration of Akzo MMAO type 3A in isopentane was 2.1% and the feedrate of MMAO solution was held fixed at approximately 50 ml/hr. The mixture of catalyst slurry and MMAO solution were fed to the reactor via a ⅛ inch(0.32 cm) outer diameter injection tube using a constant flow of nitrogen to disperse the mixture.

The reactor was run in both continuous and batch modes. Typical batch yields of granular polyethylene in the reactor were 7–20 lbs. Each run typically lasted 3–6 hours. In continuous mode, granular polymer was withdrawn at 190 in typically 0.4 lb (0.2 kg) portions while the polymerization was in progress. In the continuous mode, the product discharge system was enabled after the bed weight built to 12–20 lbs (5.4–9.1 kg), and the rate of discharge was altered to maintain constant bed weight as calculated by material balance.

In each of Comparative 9 and Examples 22–28, the polymerization process was begun by charging the monomers to the reactor and adjusting the feeds until the desired gas composition was reached. An initial charge of cocatalyst was added prior to starting catalyst feeding in order to scavenge any poisons present in the reactor. After catalyst feed started, the monomers were added to the reactor in amounts sufficient to maintain gas concentrations and ratios. As the catalyst inventory built up, the polyethylene production rate increased to 5–10 lbs/hr (2.3–4.5 kg/hr), at which point the catalyst feed was adjusted to maintain a constant polyethylene production rate. For Comparative 9, cocatalyst feed rate was maintained in proportion to the catalyst feed rate. After the desired batch weight was made, the reactor was quickly vented, and monomers were purged from the polyethylene resin with nitrogen. The batch was then discharged through valve 190 to the open atmosphere.

| example | catalyst | temp (°C.) | H2/ C2 | C6/ C2 | yield lbs | yield kg | MI dg/min | FI dg/min | density g/cc |
|---|---|---|---|---|---|---|---|---|---|
| comp 9 | A | 85 | 0.0015 | 0.0057 | 6.6 | 3.0 | 0.413 | 20.2 | 0.937 |
| 22 | 5 | 80 | 0.0013 | 0.0030 | 15.9 | 7.2 | — | 1.15 | 0.935 |
| 23 | 10 | 80 | 0.0013 | 0.0057 | 36.7 | 16.7 | 2.62 | 101.2 | 0.942 |
| 24 | 11 | 80 | 0.0013 | 0.0046 | 37.9 | 17.2 | 1.58 | 70.4 | 0.946 |
| 25 | 11 | 80 | 0.0012 | 0.0041 | 27.7 | 12.6 | 0.71 | 30.1 | 0.944 |
| 26 | 6 | 80 | 0.0020 | 0.0045 | 6.6 | 3.0 | — | 0.2 | 0.937 |
| 27 | 12 | 80 | 0.0019 | 0.0048 | 15.9 | 7.2 | 1.71 | 130.7 | 0.935 |
| 28 | 12 | 80 | 0.0008 | 0.0055 | 36.7 | 16.7 | 1.56 | 49.2 | 0.942 |

A = {[(2,4,6-Me$_3$C$_6$H$_2$)NCH$_2$CH$_2$]$_2$NH}ZrBz$_2$ injected as a MMAO-3A activated solution.

Indenyl zirconium tris pivalate when spray dried as described herein produced polymer, but had low activity.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly it is not intended that the invention be limited thereby.

What is claimed is:

1. A composition comprising a fumed particulate filler and a catalyst compound represented by the formula:

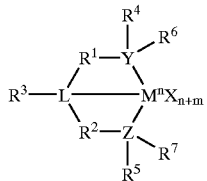

wherein M is a Group 4, 5 or 6 metal;
each X is independently an anionic leaving groups;
n is the oxidation state of M;
m is the formal charge of the ligand comprising Y, Z and L;
Y is a Group 15 atom;
Z is a Group 15 atom;
L is a Group 15 atom;
$R^1$ and $R^2$ are independently a $C_1$ to $C_{20}$ hydrocarbon group, or a heteroatom containing group wherein the heteroatom is silicon, germanium, tin, lead, or phosphorus; optionally, $R^1$ and $R^2$ are interconnected to each other;
$R^3$ is absent, a hydrogen, a group 14 atom containing group, a halogen, or a heteroatom containing group;
$R^4$ and $R^5$ are independently an alkyl group, an aryl group, a substituted aryl group, a cyclic alkyl group, a substituted cyclic alkyl group, or a multiple ring system; and
$R^6$ and $R^7$ are independently absent, a hydrogen, an alkyl group, a halogen, a heteroatom, a hydrocarbyl group, or a heteroatom containing group.

2. The composition of claim 1, further comprising a metallocene-type compound.

3. The composition of claim 1, wherein M is zirconium or hafnium.

4. The composition of claim 1, wherein each X is independently a hydrogen, a halogen or a hydrocarbyl group.

5. The composition of claim 1, wherein $R^1$ and $R^2$ are independently a $C_2$ to $C_6$ hydrocarbon group.

6. The composition of claim 1, where $R^1$ and $R^2$ are a $C_1$ to $C_{20}$ alkylene, $C_5$ to $C_{20}$ arylene or $C_5$ to $C_{20}$ arylalkylene group.

7. The composition of claim 1, wherein m is 0, −1, −2, or −3 and n is +3, +4 or +5.

8. The composition of claim 1, wherein $R^3$ is hydrogen or a methyl group.

9. The composition of claim 1, wherein $R^4$ and $R^5$ are independently an alkyl group, an aryl group, a substituted aryl group, a cyclic alkyl group, a substituted cyclic alkyl group, or a multiple ring system having up to 20 carbon atoms.

10. The composition of claim 1, wherein $R^4$ and $R^5$ are independently a $C_1$ to $C_{20}$ aryl group or a $C_5$ to $C_{20}$ arylalkyl group.

11. The composition of claim 1, wherein $R^4$ and $R^5$ are independently a cyclic arylalkyl group.

12. The composition of claim 1, wherein $R^4$ and $R^5$ are independently a group represented by the following formula:

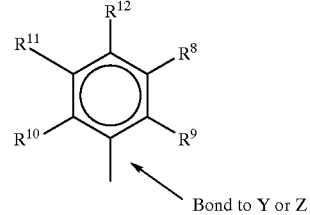

wherein each $R^8$ to $R^{12}$ are independently hydrogen, a $C_1$ to $C_{20}$ alkyl group, a heteroatom, or a heteroatom containing group having up to 40 carbon atoms, and any two $R^{8-12}$ groups can combine to form a cyclic group or a heterocyclic group.

13. The composition of claim 12, wherein $R^9$, $R^{10}$ and $R^{12}$ are methyl and $R^8$ and $R^{11}$ are hydrogen.

14. The composition of claim 1, further comprising an activator, wherein the activator is selected from the group consisting of alkyl aluminum compounds, alumoxanes, modified alumoxanes, non-coordinating anions, boranes, borates, ionizing compounds, and combinations thereof.

15. The composition of claim 1, wherein the composition further comprises mineral oil.

16. The composition of claim 15, wherein the composition is a slurry of solids, the solids concentration ranging from 10 to 15 wt %.

17. The composition of claim 1, wherein the composition has a particle size up to 25 μm.

18. The composition of claim 1, wherein the particulate filler has an average particle size of 0.001 microns to 1 micron.

19. The composition of claim 1, wherein the particulate filler has been treated with dimethylsilyldichloride.

20. A composition comprising a slurry of mineral oil, particulate filler, a metallocene catalyst compound, and a catalyst compound represented by the formula:

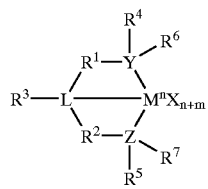

wherein M is a Group 4, 5 or 6 metal
each X is independently an anionic leaving group;
n is the oxidation state of M;
m is the formal charge of the ligand comprising Y, Z and L;
Y is a Group 15 atom;
Z is a Group 15 atom;
L is a Group 15 atom;
  $R^1$ and $R^2$ are independently a $C_1$ to $C_{20}$ hydrocarbon group, or a heteroatom containing group wherein the heteroatom is silicon, germanium, tin, lead, or phosphorus; optionally, $R^1$ and $R^2$ are interconnected to each other;
  $R^3$ is absent, a hydrogen, a group 14 atom containing group, a halogen, or a heteroatom containing group;
  $R^4$ and $R^5$ are independently an alkyl group, an aryl group, a substituted aryl group, a cyclic alkyl group, a substituted cyclic alkyl group, or a multiple ring system; and
  $R^6$ and $R^7$ are independently absent, a hydrogen, an alkyl group, a halogen, a heteroatom, a hydrocarbyl group, or a heteroatom containing group.

21. The composition of claim 20, wherein the metallocene compound is a bridged or unbridged zirconocene or hafnocene metallocene compound.

22. The composition of claim 20, wherein M is zirconium or hafnium.

23. The composition of claim 20, wherein each X is independently a hydrogen, a halogen or a hydrocarbyl group.

24. The composition of claim 20, wherein $R^1$ and $R^2$ are independently a $C_1$ to $C_6$ hydrocarbon group.

25. The composition of claim 20, wherein $R^1$ and $R^2$ are a $C_2$ to $C_6$ hydrocarbon groups.

26. The composition of claim 20, wherein m is 0, −1, −2, or −3 and n is +3, +4 or +5.

27. The composition of claim 20, wherein $R^3$ is hydrogen or a methyl group.

28. The composition of claim 20, wherein $R^4$ and $R^5$ are independently an alkyl group, an aryl group, a substituted aryl group, a cyclic alkyl group, a substituted cyclic alkyl group, or a multiple ring system having up to 20 carbon atoms.

29. The composition of claim 20, wherein $R^4$ and $R^5$ are substituted aryl groups.

30. The composition of claim 20, wherein $R^4$ and $R^5$ are independently a cyclic arylalkyl group.

31. The composition of claim 20, wherein $R^4$ and $R^5$ are independently a group represented by the following formula:

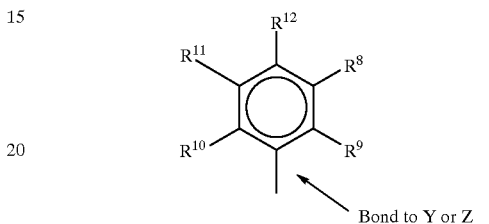

wherein each $R^8$ to $R^{12}$ are independently hydrogen, a $C_1$ to $C_{20}$ alkyl group, a heteroatom, or a heteroatom containing group having up to 40 carbon atoms, and any two $R^{8-12}$ group can combine to form a cyclic group or a heterocyclic group.

32. The composition of claim 31, wherein $R^9$, $R^{10}$ and $R^{12}$ methyl and $R^8$ and $R^{11}$ are hydrogen.

33. The composition of claim 20, further comprising an activator, wherein the activator is selected from the group consisting of alkyl aluminum compounds, alumoxanes, modified alumoxanes, non-coordinating anions, borates, borates, ionizing compounds, and combinations thereof. C 34. The composition of claim 20, wherein the composition is a slurry of solids, the solids concentration ranging from 10 to 15 wt %.

35. The composition of claim 20, wherein the composition has a particle size up to 25 μm.

36. The composition of claim 20, wherein the particulate filler has an average particle size of 0.001 microns to 1 micron.

37. The composition of claim 20, wherein the particulate filler is fumed silica.

38. The composition of claim 33, wherein the particulate filler comprises silica, the activator comprises an alumoxane; wherein the silica comprises from 50 to 60 wt% of the dried support, catalyst compound and activator composition.

39. The composition of claim 33, wherein the activator, particulate filler and at least one catalyst compound are spray-dried.

* * * * *